(12) United States Patent
Kim et al.

(10) Patent No.: US 11,776,410 B2
(45) Date of Patent: Oct. 3, 2023

(54) PLATOONING CONTROLLER, SYSTEM INCLUDING THE SAME, AND METHOD THEREOF

(71) Applicants: Hyundai Motor Company, Seoul (KR); Kia Motors Corporation, Seoul (KR)

(72) Inventors: Dong Hyuk Kim, Gyeonggi-do (KR); Sang Yeob Lee, Gyeonggi-do (KR); Il Hwan Kim, Gyeonggi-do (KR); Hong Gi Park, Seoul (KR); Kyung Joo Bang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 371 days.

(21) Appl. No.: 16/795,179

(22) Filed: Feb. 19, 2020

(65) Prior Publication Data
US 2021/0065557 A1    Mar. 4, 2021

(30) Foreign Application Priority Data

Aug. 27, 2019 (KR) ........................ 10-2019-0105430

(51) Int. Cl.
*G08G 1/00* (2006.01)
*G05D 1/00* (2006.01)
(Continued)

(52) U.S. Cl.
CPC .............. *G08G 1/22* (2013.01); *G05D 1/0016* (2013.01); *G05D 1/0027* (2013.01);
(Continued)

(58) Field of Classification Search
CPC ........ G08G 1/22; G08G 1/133; G08G 1/0962; G08G 1/09; G08G 1/20; G08G 1/00;
(Continued)

(56) References Cited

U.S. PATENT DOCUMENTS 2,040,154 A * 5/1936 Powell ................. B65D 5/6608
493/139
10,703,262 B1 * 7/2020 Hong .................... G05D 1/0287
(Continued)

FOREIGN PATENT DOCUMENTS

EP        2040154 A2 *  3/2009  ......... G06F 3/04817
EP        2040154 A2     3/2009
(Continued)

OTHER PUBLICATIONS

Borojeni et al., "Design of a Human-Machine Interface for Truck Platooning", 34th Annual ACM Conference on Human Factors in Computing Systems, May 7, 2016, 7 pages.
(Continued)

*Primary Examiner* — Richard A Goldman
(74) *Attorney, Agent, or Firm* — Fox Rothschild LLP

(57) ABSTRACT

A platooning controller, a vehicle system including the same, and a method thereof are provided. The platooning controller includes a processor that displays each of a plurality of vehicles forming a platoon as a certain vehicle area and arranges and displays vehicle areas of the vehicles on a screen to be partially overlapped with each other. A storage stores information for configuring the screen by the processor.

18 Claims, 12 Drawing Sheets

(51) Int. Cl.
*G05D 1/02* (2020.01)
*G06F 3/0486* (2013.01)
*G06F 3/0488* (2022.01)

(52) U.S. Cl.
CPC ... *G05D 1/0293* (2013.01); *G05D 2201/0213* (2013.01); *G06F 3/0486* (2013.01); *G06F 3/0488* (2013.01)

(58) Field of Classification Search
CPC .. G05D 1/0016; G05D 1/0027; G05D 1/0293; G05D 2201/0213; G05D 1/0291; G05D 1/00; G05D 1/0044; G05D 1/0246; G06F 3/0486; G06F 3/0488; G06F 3/14; B60W 30/165; B60W 50/08; B60W 50/14; B60W 2050/146; B60W 40/13; B60W 2300/00; B60W 2530/10; B60W 2530/18; B60K 35/00; B60K 2370/1438; B60K 2370/52; B60Y 2300/165
USPC .............................................................. 701/2
See application file for complete search history.

(56) References Cited

U.S. PATENT DOCUMENTS

| | | | | |
|---|---|---|---|---|
| 2010/0256852 | A1* | 10/2010 | Mudalige | G08G 1/164 701/24 |
| 2014/0316671 | A1* | 10/2014 | Okamoto | G08G 1/22 701/96 |
| 2016/0267796 | A1* | 9/2016 | Hiroma | B60W 30/165 |
| 2017/0293296 | A1* | 10/2017 | Stenneth | G06Q 20/10 |
| 2017/0344023 | A1* | 11/2017 | Laubinger | G08G 1/22 |
| 2017/0349176 | A1* | 12/2017 | Alden | H04W 4/44 |
| 2018/0322791 | A1* | 11/2018 | Brooks | B61L 15/0072 |
| 2019/0051158 | A1* | 2/2019 | Felip Leon | G08G 1/096783 |
| 2019/0096265 | A1* | 3/2019 | Mok | G08G 1/163 |
| 2019/0206261 | A1* | 7/2019 | Szymczak | B60W 30/16 |
| 2020/0017106 | A1* | 1/2020 | Park | B60W 30/16 |
| 2020/0027355 | A1* | 1/2020 | Sujan | H04W 4/023 |
| 2020/0080853 | A1* | 3/2020 | Tam | G05D 1/0276 |
| 2020/0118445 | A1* | 4/2020 | Kim | H04W 4/46 |
| 2020/0135033 | A1* | 4/2020 | Switkes | G08G 1/22 |
| 2020/0183546 | A1* | 6/2020 | Kim | B60K 35/00 |
| 2020/0209889 | A1* | 7/2020 | Dev | B60R 1/00 |
| 2020/0314952 | A1* | 10/2020 | Jornod | G08G 1/22 |
| 2020/0349850 | A1* | 11/2020 | Park | G08G 1/22 |
| 2020/0402409 | A1* | 12/2020 | Shida | G08G 1/202 |
| 2021/0026373 | A1* | 1/2021 | Jamison | G01S 13/931 |
| 2021/0065557 | A1* | 3/2021 | Kim | G08G 1/22 |
| 2021/0104092 | A1* | 4/2021 | Nishi | G06T 7/70 |
| 2021/0319408 | A1* | 10/2021 | Jorasch | G06Q 10/1095 |
| 2021/0319701 | A1* | 10/2021 | Mishima | G08G 1/096725 |
| 2021/0358308 | A1* | 11/2021 | Li | G08G 1/22 |
| 2022/0139229 | A1* | 5/2022 | Hong | H04W 4/40 701/26 |
| 2022/0244743 | A1* | 8/2022 | Ganlath | G05D 1/0295 |

FOREIGN PATENT DOCUMENTS

| | | |
|---|---|---|
| KR | 10-2020-0075913 A | 6/2020 |
| WO | 2019/098434 A1 | 5/2019 |

OTHER PUBLICATIONS

Extended European Search Report issued in European Application No. 20157377.1, dated Aug. 21, 2020, 10 pages.

* cited by examiner

PLATOONING CONTROLLER, SYSTEM INCLUDING THE SAME, AND METHOD THEREOF

CROSS-REFERENCE TO RELATED APPLICATION

This application is claims the benefit of priority to Korean Patent Application No. 10-2019-0105430, filed on Aug. 27, 2019, the entire contents of which are incorporated herein by reference.

TECHNICAL FIELD

The present disclosure relates to a platooning controller, a system including the same, and a method thereof, and more particularly, to technologies of joining a platooning line, departing from the platooning line, and adjusting the platooning line during platooning.

BACKGROUND

Platooning is a method for exchanging movement and context information of a leading vehicle via real-time communication between vehicles and for maintaining a certain interval with the leading vehicle to drive several vehicles together. Since following vehicles travel while maintaining the certain interval with the leading vehicle in platooning, the platooning reduces air resistance of the following vehicles, thus saving fuel efficiency and reducing the risk of an accident.

Existing platooning methods display platooning context information on vehicles in a platooning line during platooning and perform human machine interface (HMI) integrated control. However, as the number of platooning vehicles increases, it is difficult to perform platooning integrated control and display all platooning vehicles on one screen. Furthermore, the developed platooning methods, are unable to adjust a platooning line or control to change a platooning location on a screen and unable to inquire about a state of a platooning vehicle or intuitively identify a vehicle height.

SUMMARY

The present disclosure provides a platooning controller configured to display vehicle areas of platooning vehicles in a manner to be partially overlapped with each other, displaying all of a substantial number of platooning vehicles on one screen, and displaying states of the platooning vehicles to allow a user to intuitively view the states to increase the efficiency of platooning control, a system including the same, and a method thereof.

Another aspect of the present disclosure provides a platooning controller configured to input a command for platooning control on a screen in a touch manner to conveniently reflect an intention of the user to perform platooning control and perform the platooning control, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a platooning controller may include: a processor configured to display each of a plurality of vehicles forming a platoon as a certain vehicle area and arrange and display vehicle areas of the vehicles on a screen to be partially overlapped with each other and a storage configured to store information for configuring the screen by the processor. The processor may be configured to perform platooning control based on movement of the vehicle area of the vehicle in a drag and drop technique. In addition, the processor may be configured to perform at least one platooning control among joining a platooning line, departing from the platooning line, and adjusting the platooning line.

In an exemplary embodiment, the processor may be configured to display a size of the vehicle area differently based on at least one of a model, a vehicle height, and/or a vehicle weight for each vehicle. The processor may also be configured to display a vertical length of the vehicle area differently based on a height of the vehicle. The processor may be configured to separately display at least one or more of shapes, colors, and/or borders of vehicle areas of a host vehicle and another vehicle among platooning vehicles.

Further, the processor may expand a selected vehicle area, when one of the vehicle areas of the vehicles is selected, and may be configured to display vehicle state information on the expanded vehicle area. The vehicle state information may include at least one or more of a model, a destination, a payload, a payload weight, a vehicle height, information indicating whether a spoiler is mounted on the vehicle, and/or a total driving distance during platooning. The processor may be configured to control a vehicle area of a vehicle to perform the platooning control to blink upon the platooning control and stop blinking when the platooning control is completed.

In an exemplary embodiment, the processor may be configured to perform the platooning control to request a leading vehicle to form a platoon, receive approval to the request, and move the vehicle area of the host vehicle to a location matched to an order in the platooning line, when a vehicle area of a host vehicle is dragged and dropped to be moved to a location partially overlapped with a vehicle area of the platooning line or to be moved less than or equal to a predefined distance from the vehicle area of the platooning line. In addition, the processor may be configured to perform platoon departure control, when a vehicle area of a host vehicle is dragged and dropped to be moved greater than a predefined distance from a vehicle area of a platooning line.

The processor may also be configured to request a vehicle of a moved vehicle area to move a location in a platooning line, when one of the vehicle areas of the vehicles is dragged and dropped to be moved to another location in the platooning line, and request a following vehicle to be located behind the moved vehicle area to adjust a platooning interval, when the vehicle of the moved vehicle area approves the request for moving the location in the platooning line.

According to another aspect of the present disclosure, a vehicle system may include: a platooning controller configured to display each of a plurality of vehicles forming a platoon as a certain vehicle area and arrange and display vehicle areas of the vehicles on a screen to be partially overlapped with each other and a display that displays the screen. In an exemplary embodiment, the display may be driven in a touch screen mode. The vehicle system may further include a communication device configured to perform communication between vehicles in a platooning line and share platooning information.

According to another aspect of the present disclosure, a platooning control method may include: configuring each of a plurality of vehicles forming a platoon as a certain vehicle area on a platooning control screen and arranging vehicle areas of the vehicles to be partially overlapped with each other to configure a screen. In an exemplary embodiment, the platooning control method may further include performing platooning control based on movement of the vehicle area of the vehicle in a drag and drop technique.

In particular, the configuring of the screen may include expanding a selected vehicle area, when one of the vehicle areas of the vehicles is selected and configuring the screen to display vehicle state information on the expanded vehicle area. The the performing of the platooning control may include performing the platooning control to request a leading vehicle to form a platoon, receive approval to the request, and move the vehicle area of the host vehicle to a location matched to an order in the platooning line, when a vehicle area of a host vehicle is dragged and dropped to be moved a location partially overlapped with a vehicle area of the platooning line or to be moved less than or equal to a predefined distance from the vehicle area of the platooning line. In addition, the performing of the platooning control may include performing platoon departure control, when a vehicle area of a host vehicle is dragged and dropped to be moved greater than a predefined distance from a vehicle area of a platooning line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
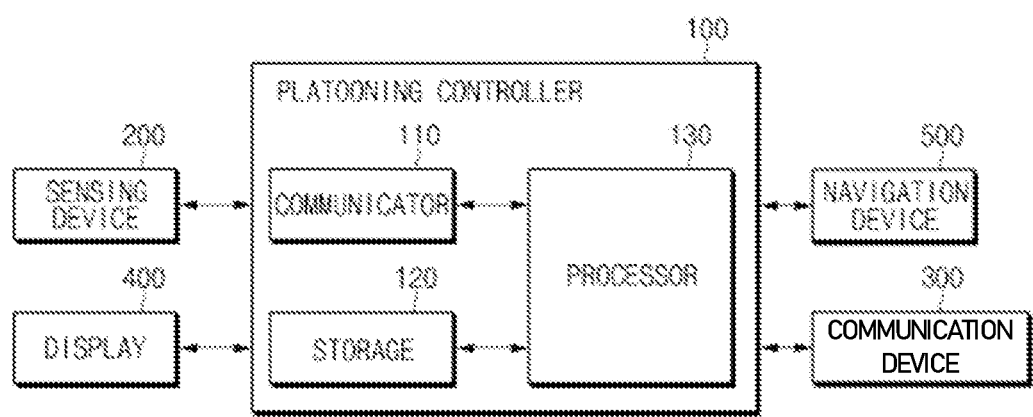
FIG. 1 is a block diagram illustrating a configuration of a vehicle system including a platooning controller according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present disclosure discloses technologies of controlling to join a platooning line, depart from the platooning line, and adjust the platooning line through a human machine interface (HMI).

Figure 2:
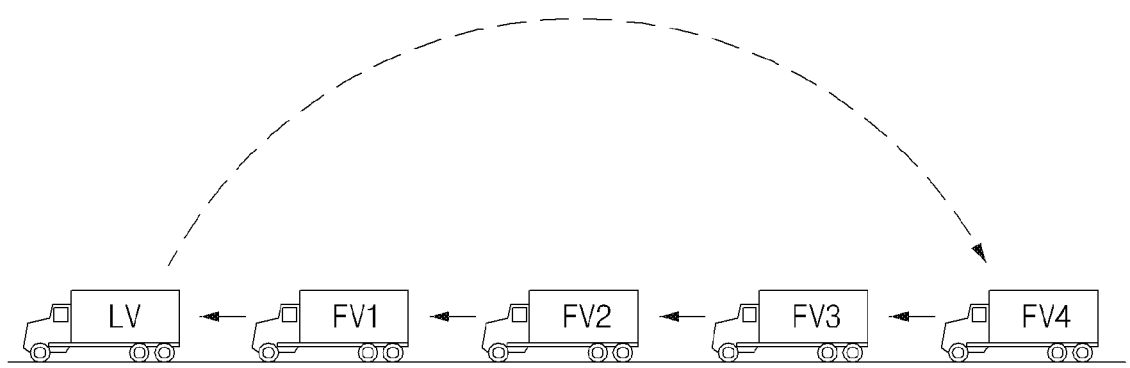
FIG. 2 is a drawing illustrating a platooning line according to an exemplary embodiment of the present disclosure.

Hereinafter, a description will be given in detail of exemplary embodiments of the present disclosure with reference to FIGS. 1 and 2. FIG. 1 is a block diagram illustrating a configuration of a vehicle system including a platooning controller according to an exemplary embodiment of the present disclosure. FIG. 2 is a drawing illustrating a platooning line according to an exemplary embodiment of the present disclosure.

Referring to FIG. 1, the vehicle system according to an exemplary embodiment of the present disclosure may include a platooning controller 100, a sensing device 200, a communication device 300, a display 400, and a navigation device 500. The platooning controller 100 may be configured to display each of a plurality of vehicles forming a platoon as a certain vehicle area and may be configured to arrange and display the vehicle areas of the vehicles on a screen to be partially overlapped with each other. Furthermore, the platooning controller 100 may be configured to perform platooning control on the screen based on movement of a vehicle area of each vehicle in a drag and drop technique. In particular, the platooning control may include at least one of joining a platooning line, departing from the platooning line, and adjusting the platooning line.

The platooning controller 100 may include a communicator 110, a storage 120, and a processor 130. The communicator 110 may be a hardware device implemented with various electronic circuits for transmitting and receiving a signal via wireless or wired connection. In an exemplary embodiment of the present disclosure, the communicator 110 may be configured to perform inter-vehicle communication via controller area network (CAN) communication, local interconnect network (LIN) communication, Ethernet communication, or the like and may be configured to communicate with the sensing device 200, the communication device 300, the display 400, and the navigation deice 500.

The storage 120 may be configured to store a sensing result of the sensing device 200, driving costs (e.g., a level of contribution, a level of emergency, fuel consumption, risk, and the like) or the like obtained by the processor 130, and information or the like received from another vehicle (e.g., a leading vehicle) in a platooning line. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be configured to display each of a plurality of vehicles forming a platoon as a certain vehicle area, may be configured to arrange and display vehicle areas of the vehicles on a screen to be partially overlapped with each other, and perform platooning control based on movement of a vehicle area of each vehicle in a drag and drop technique. The processor 130 may be configured to display a size of a vehicle area differently based on at least one of vehicle states for each vehicle, that is, a model, a vehicle height, and/or a vehicle weight and display a vertical length of the vehicle area differently based on a height of the vehicle. The processor 130 may be configured to separately display at least one or more of shapes, colors, and/or borders of the host vehicle and another vehicle among platooning vehicles.

Furthermore, when one of vehicle areas of the vehicles is selected, the processor 130 may be configured to expand the selected vehicle area and display vehicle state information on the expanded area. In particular, the vehicle state information may include at least one or more of a model, a destination, a payload, a payload weight, a vehicle height, information indicating whether a spoiler is mounted on the vehicle, and/or a total driving distance during platooning. The processor 130 may be configured to operate to output a blinking of a vehicle area of the host vehicle upon platooning control and stop the blinking of the vehicle arear of the host vehicle when the platooning control is complete.

When the vehicle area of the host vehicle is dragged and dropped to be moved to a location partially overlapped with a vehicle area of a platooning line or be moved less than or equal to a predefined distance from the vehicle area of the platooning line, the processor 130 may be configured to perform platooning control to request a leading vehicle to form a platoon, receive approval to the request, and move the vehicle area of the host vehicle to a location matched to an order in a platooning line. When the vehicle area of the host vehicle is dragged and dropped to be moved greater than a predefined distance from the vehicle area of the platooning line, the processor 130 may be configured to perform platoon departure control.

When one of vehicle areas of the vehicles is dragged and dropped onto another location in a platooning line, the processor 130 may be configured to request the vehicle of the moved vehicle area to move a location in the platooning line. When the vehicle of the moved vehicle area approves the request for moving the location in the platooning line, the processor 130 may be configured to request a following vehicle to be located behind the moved vehicle area to adjust a platooning interval and receive approval to the request from the following vehicle.

The sensing device 200 may include a plurality of sensors configured to sense external objects, such as vehicles in front of and behind the host vehicle, during platooning, sense a leading vehicle, and obtain information associated with a location of the external object, a speed of the external object, a movement direction of the external object, and/or a type of the external object (e.g., a vehicle, a pedestrian, a bicycle, a motorcycle, or the like). Accordingly, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like. Furthermore, the sensing device 200 may be loaded into the front, the both sides, or the rear of the host vehicle.

Although not illustrated in Fla 1, the vehicle system according to an exemplary embodiment of the present disclosure may further include a global positioning system (GPS) receiver configured to receive a global positioning system (UPS) signal. The communication device 300 may be configured to perform vehicle to everything (V2X) communication between vehicles which are during platooning and share information for platooning between platooning vehicles.

The display 400 may be configured to display some of vehicle areas in a platooning line formed by the processor 130 to be overlapped with each other, display information received from vehicles which are during platooning, a driving situation and path or the like of the host vehicle, and receive a command through touch or drag and drop of a user. The display 400 may be implemented as a head-up display (HUD), a cluster, an audio video navigation (AVN), or the like. Furthermore, the display 400 may be integrated and implemented into one HMI capable of performing touch recognition. Furthermore, the display 400 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display 400 may be implemented as a touchscreen including a touch panel to be used as an input device other than an output device. The navigation device 500 may be configured to provide a path to a platooning destination to the platooning controller 100.

Figure 3:
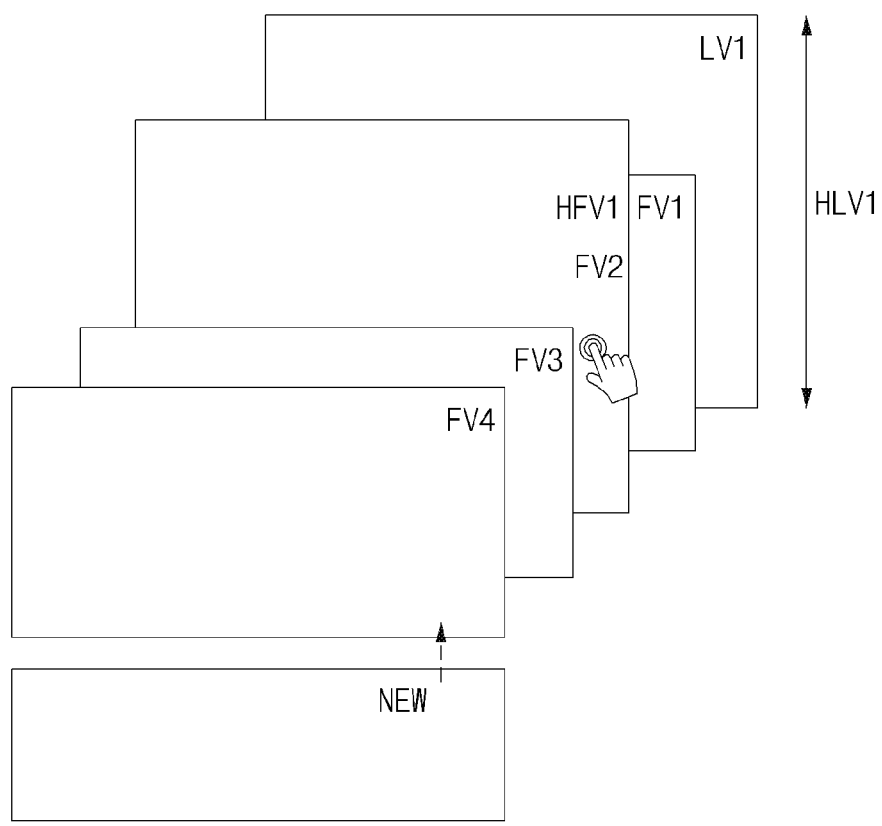
FIG. 3 is a drawing illustrating a screen for displaying vehicle areas of platooning vehicles in a manner of arranging and displaying the vehicle areas of the platooning vehicles to be partially overlapped with each other, according to an exemplary embodiment of the present disclosure.

FIG. 3 is a drawing illustrating a screen for displaying vehicle areas of platooning vehicles in a manner of arranging and displaying the vehicle areas of the platooning vehicles to be partially overlapped with each other, according to an exemplary embodiment of the present disclosure. Referring to FIG. 3, a platooning controller 100 of FIG. 1 may be configured to display leading vehicle LV1 and following vehicles FV1, FV2, FV3, and FV4, which are during platooning, as vehicle areas, respectively, and may be configured to display the vehicle areas as a structure of laminating the vehicle areas. The platooning controller 100 may be configured to arrange and display the vehicle areas to be partially overlapped with each other and locate leading vehicle LV1 at the bottom of the vehicle areas.

In FIG. 3, an exemplary embodiment is exemplified as leading vehicle LV1 is arranged to be located at the bottom of the laminated vehicle areas. However, exemplary embodiments are not limited thereto. For example, leading vehicle LV1 may be arranged to be located at the top of the laminated vehicle areas. Furthermore, the platooning controller 100 may be configured to display the vehicle area of each of leading vehicle LV1 and following vehicles FV1, FV2, FV3, and FV4 as a box type or the like. The platooning controller 100 may be configured to reflect vehicle height information in the vehicle area to differently display a height of a box for each vehicle to allow a user to intuitively identity a platoon arrangement shape and a height of each vehicle. In FIG. 3, when a vehicle height of leading vehicle LV1 is HLV1 and when a vehicle height of following vehicle FV1 is HFV1, it may be seen that the vehicle height of leading vehicle LV1 is higher than that of following vehicle FV1.

Furthermore, the platooning controller 100 may be configured to display a host vehicle and another vehicle among platooning vehicles differently using hatching, a color, a thickness of a border line, a color of the border line, or the like, to allow the user to intuitively distinguish the host vehicle from the other vehicle. Furthermore, the platooning controller 100 may implement various detailed instructions according to situations of inquiring regarding information of a vehicle included in a platooning group, selecting and joining a platooning line, departing from the middle of the platooning line, departing from the rear of the platooning line, and adjusting the platooning line using movement of a finger of a user when the user touches a vehicle area displayed on a display 400 of FIG. 1.

Figure 4:
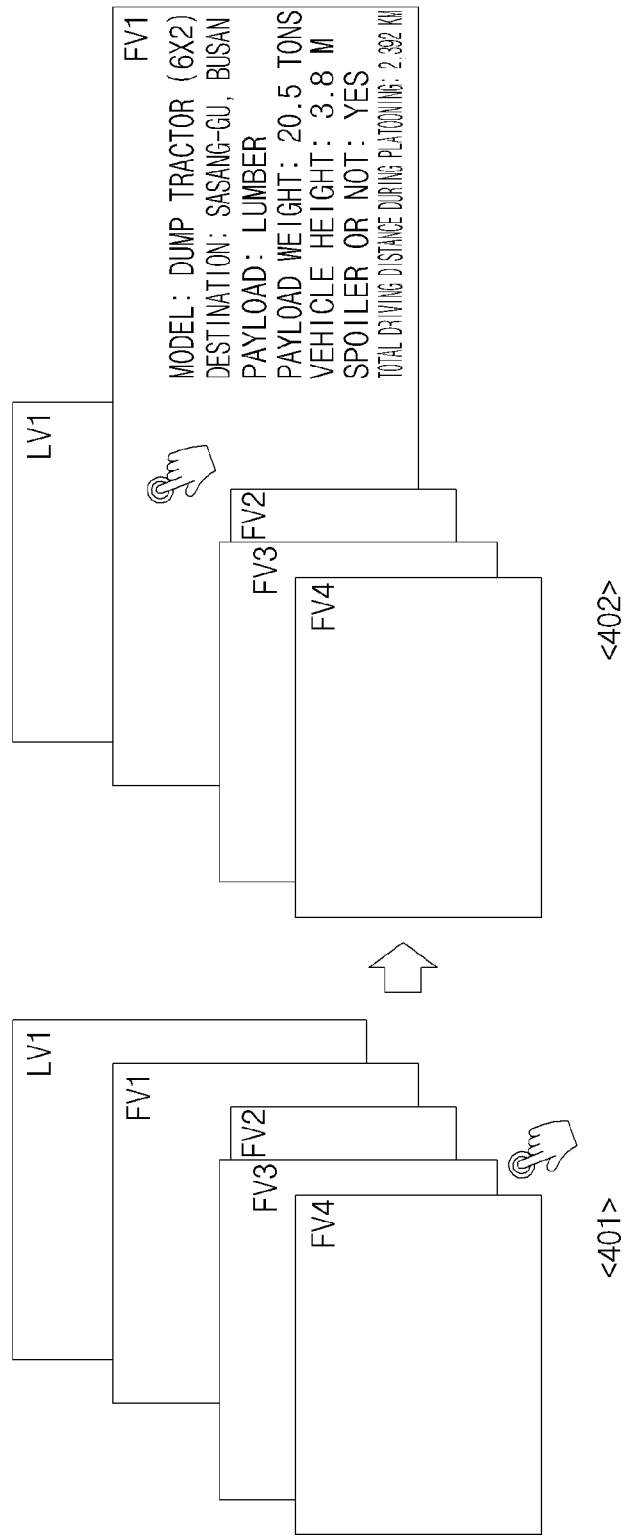
FIG. 4 is a drawing illustrating a screen for displaying a process of inquiring about information about states of platooning vehicles according to an exemplary embodiment of the present disclosure.

FIG. 4 is a drawing illustrating a screen for displaying a process of inquiring about information regarding states of platooning vehicles according to an exemplary embodiment of the present disclosure. Referring to reference numeral 401 of FIG. 4, when a user touches and selects a vehicle area of following vehicle FV1 displayed on a screen of a display 400 of FIG. 1 to inquire about information regarding a state of following vehicle FV1, like reference numeral 402, a platooning controller 100 of FIG. 1 may be configured to expand the vehicle area of following vehicle FV1 and display vehicle state information of following vehicle FV1 on the expanded vehicle area.

In this particular, the vehicle state information may include a model, a destination, a payload type, a payload weight, a vehicle height, information indicating whether a spoiler is mounted on the vehicle, a total driving distance during platooning, or the like. In reference numeral 402, for example, it is indicated that the model is a dump tractor (6×2), that the destination is Sasang-gu in Busan, that the payload is lumber, that the payload weight is 20.5 tons, that the vehicle height is 3.8 m, that the spoiler is mounted on the vehicle, and that the total driving distance during platooning is 2,393 Km. Furthermore, in reference numeral 402, an exemplary embodiment is exemplified as the vehicle area is expanded and lengthened to the right and the vehicle information is displayed on the expanded area. However, exemplary embodiments are not limited thereto. For example, the direction where the vehicle area is expanded may be adjusted for convenience.

Figure 5:
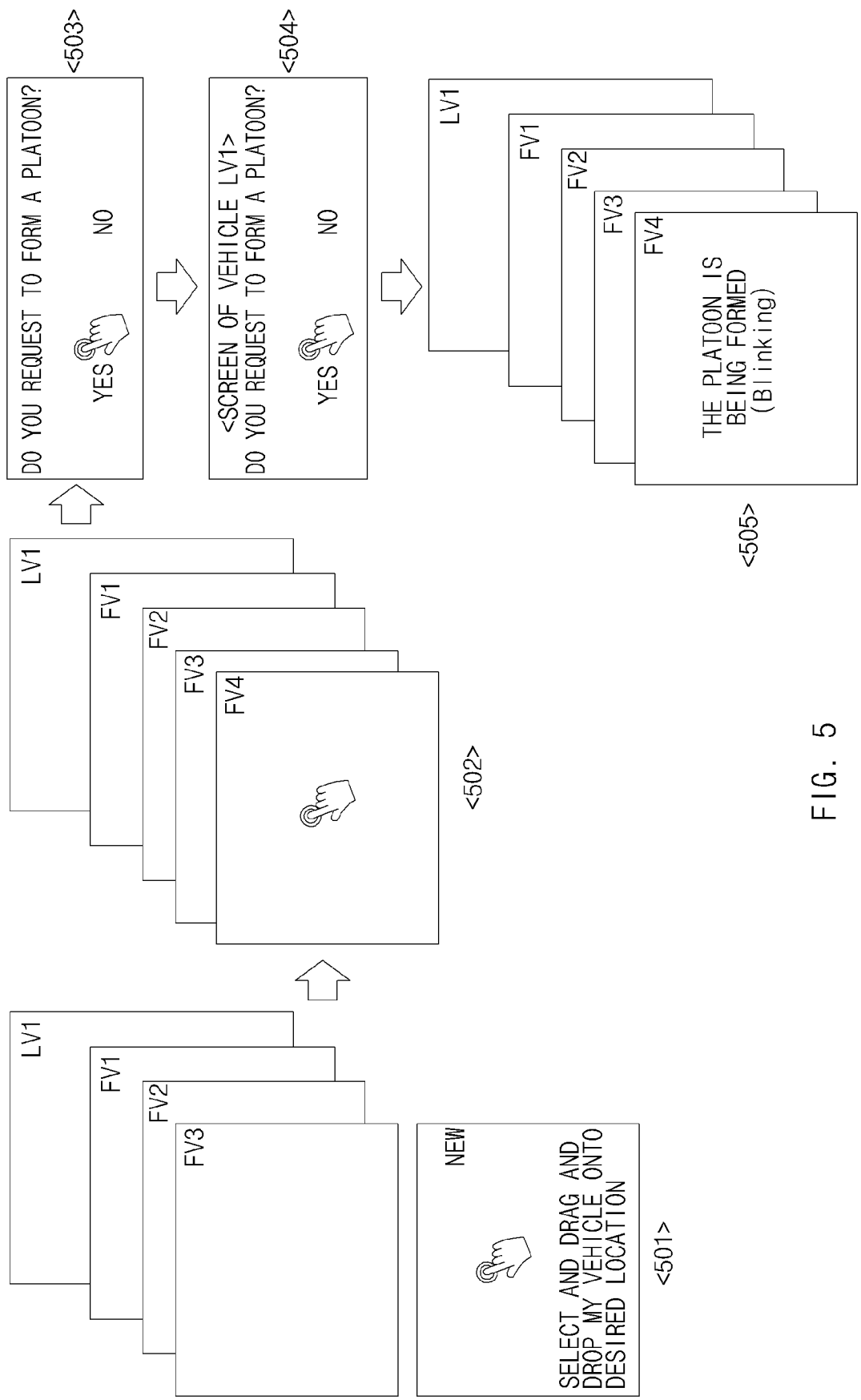
FIG. 5 is a drawing illustrating a screen for displaying a process of controlling to form a platoon according to an exemplary embodiment of the present disclosure.

FIG. 5 is a drawing illustrating a screen for displaying a process of controlling to form a platoon according to an exemplary embodiment of the present disclosure. Referring to FIG. 5, a user may select and drag and drop a host vehicle for joining a platooning line onto a desired location to form a platoon. In reference numeral 501 of FIG. 5, an exemplary embodiment is exemplified as the host vehicle joins the tail end of following vehicles. Referring to reference numeral 502, a platooning controller 100 of FIG. 1 may be configured to display following vehicle FV4 added to the location dragged and dropped by the user on a display 400 of FIG. 1 and display a question and answer screen, such as reference numeral 503, for requesting whether to form a platoon, on the display 400.

Thus, the platooning controller 100 of following vehicle FV4 may be configured to request the leading vehicle LV1 to form a platoon. A question and answer screen, such as reference numeral 504, for requesting approval to form the platoon may be displayed on a screen of a display of leading vehicle LV1. Thus, a user of leading vehicle LV1 may approve the formation of the platoon including following vehicle FV4, and the following vehicle FV4 may join a platooning line. The platooning controller 100 may be configured to operate to blink a vehicle area of following vehicle FV4 like reference numeral 505 while following vehicle FV4 joins the platooning line and stop the blinking when the joining to the platooning line is completed.

Accordingly, when vehicle FV4 which wants to join the platooning line is dragged and dropped by a user, the platooning controller 100 of vehicle FV4 may be configured to determine that the user wants to join the dragged and dropped location in the platooning line and request the leading vehicle LV1 to form a platoon. When leading vehicle LV1 approves the request, vehicle FV4 may join the platooning line. When vehicle FV4 joins the platooning line, the platooning controller 100 may be configured to display a vehicle area of the joined vehicle FV4 displayed on the display 400 in a blinking manner. When the joining to the platooning line is completed, the platooning controller 100 may stop the blinking of the vehicle area.

Figure 6:
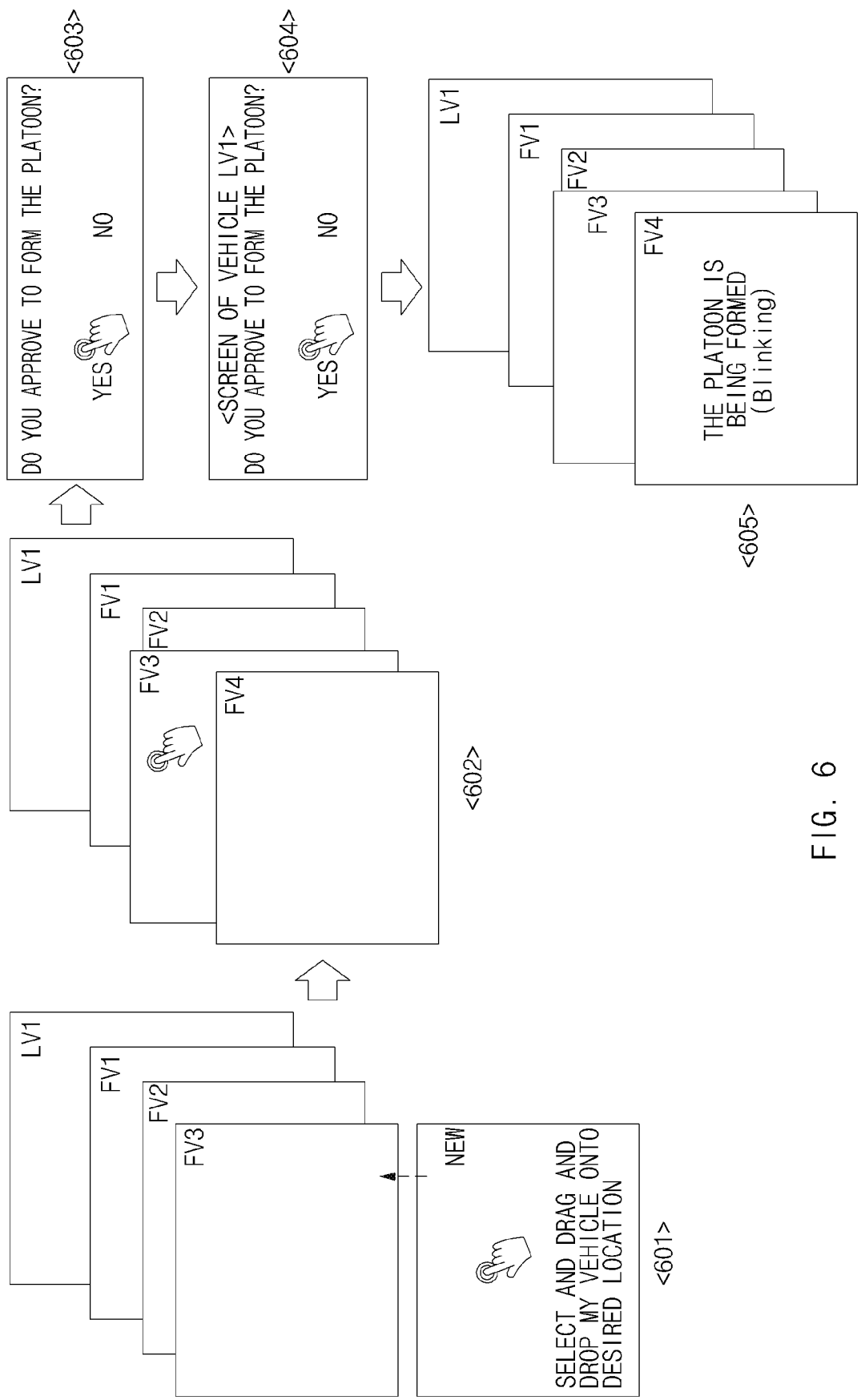
FIG. 6 is a drawing illustrating a screen for displaying a process of controlling to join a middle location of a platooning line according to an exemplary embodiment of the present disclosure.

FIG. 6 is a drawing illustrating a screen for displaying a process of controlling to join a middle location of a platooning line according to an exemplary embodiment of the present disclosure. In FIG. 6, an exemplary embodiment is exemplified as a host vehicle wants to join the middle of a platooning line rather than the end of the platooning line. A user of the host vehicle may touch a vehicle area of the host vehicle like reference numeral 601 and may drag and drop the vehicle area of the host vehicle onto the middle of the platooning line (between following vehicles FV2 and FV3) like reference numeral 602. Like reference numeral 603, a platooning controller 100 of FIG. 1 may be configured to display a question and answer screen for querying the leading vehicle LV1 whether to request to form a platoon.

When the user of the host vehicle touches "Yes", the platooning controller 100 may be configured to transmit a platoon request message to the leading vehicle LV1. A display of leading vehicle LV1 may be configured to display a question and answer screen, such as reference numeral 604, for approving the request for forming the platoon. When a user of leading vehicle LV1 touches "Yes", the platooning controller 100 may be configured to display the vehicle area of the host vehicle to be located in the middle of the platooning line, which is the dragged and dropped location. In particular, the vehicle area of the host vehicle may blink (e.g., output in a blinking manner). When the joining to the platooning line is completed, the platooning controller 100 may be configured to stop the blinking.

Figure 7:
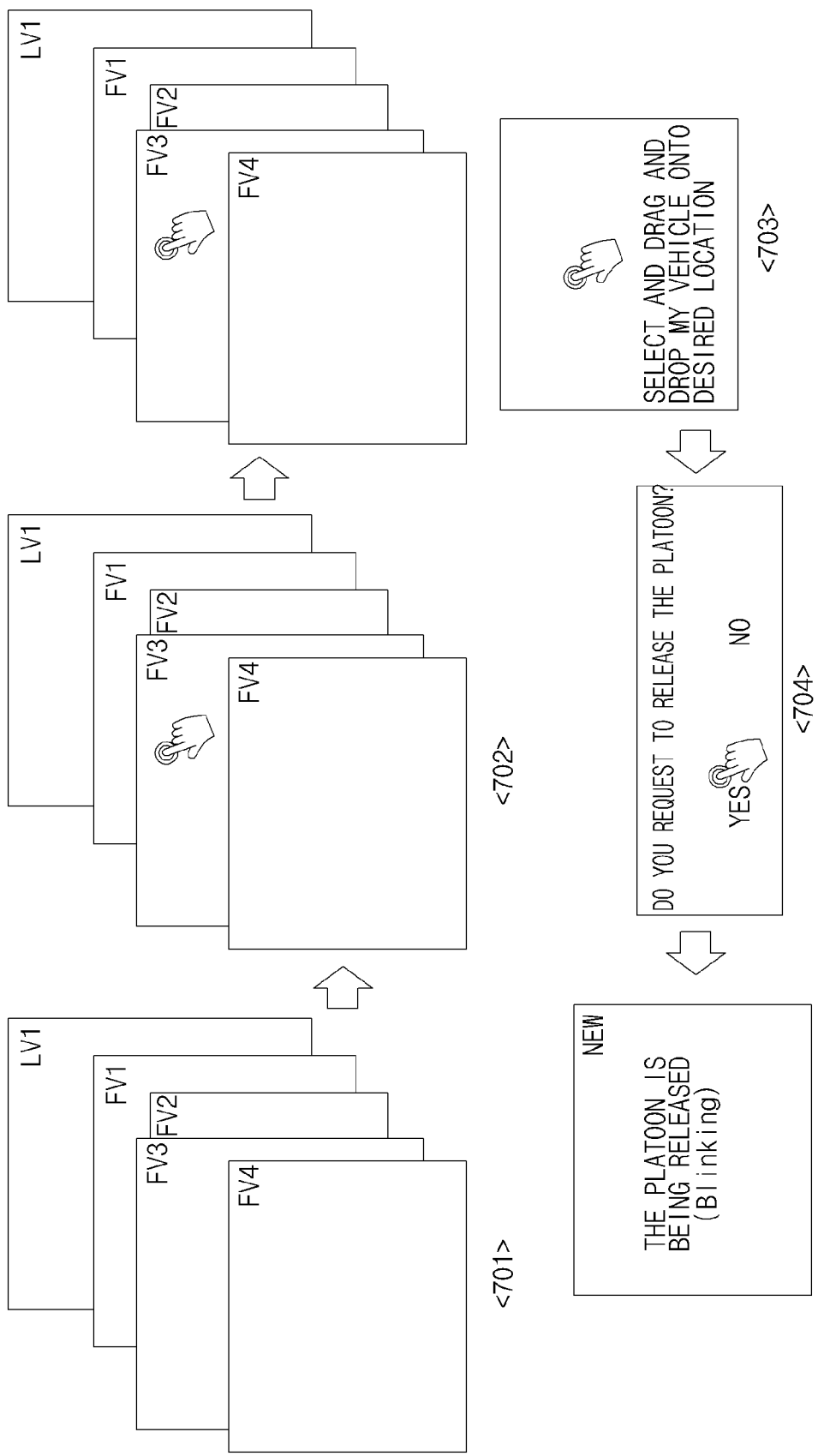
FIG. 7 is a drawing illustrating a screen for displaying a process of controlling to release a platoon according to an exemplary embodiment of the present disclosure.

FIG. 7 is a drawing illustrating a screen for displaying a process of controlling to release a platoon according to an exemplary embodiment of the present disclosure. Like reference numeral 701 of FIG. 7, vehicle areas of leading vehicle LV1 and following vehicles FV1, FV2, FV3, and FV4, which are in platooning, may be sequentially folded and displayed. When a user of following vehicle FV3 touches the vehicle area of following vehicle FV3 on a screen displayed on a display 400 of FIG. 1 like reference numeral 702 and drags and drops the vehicle area of following vehicle FV3 to be moved greater than a predefined distance from a vehicle area of a platooning line or to be moved in a predetermined specific direction (e.g., to a lower location) like reference numeral 703, a platooning controller 100 of FIG. 1 may be configured to determine that the following vehicle FV3 wants to release a platoon and display a question and answer for requesting the leading vehicle LV1 to release the platoon.

Particularly, like reference numeral 703, when following vehicle FV3 gets out of or exits the vehicle area of the platooning line, following vehicle FV4 may be corrected and displayed as following vehicle FV3. When a user touches "Yes" on a question and answer for requesting to release a platoon, the platooning controller 100 may be configured to release the platoon. While the platooning controller 100 releases the platoon, like reference numeral 705, following vehicle FV3 which is releasing the platoon may be displayed as a new vehicle NEW in a blinking manner. When the releasing of the platoon is completed, the platooning controller 100 may be configured to stop the blinking.

Figure 8:
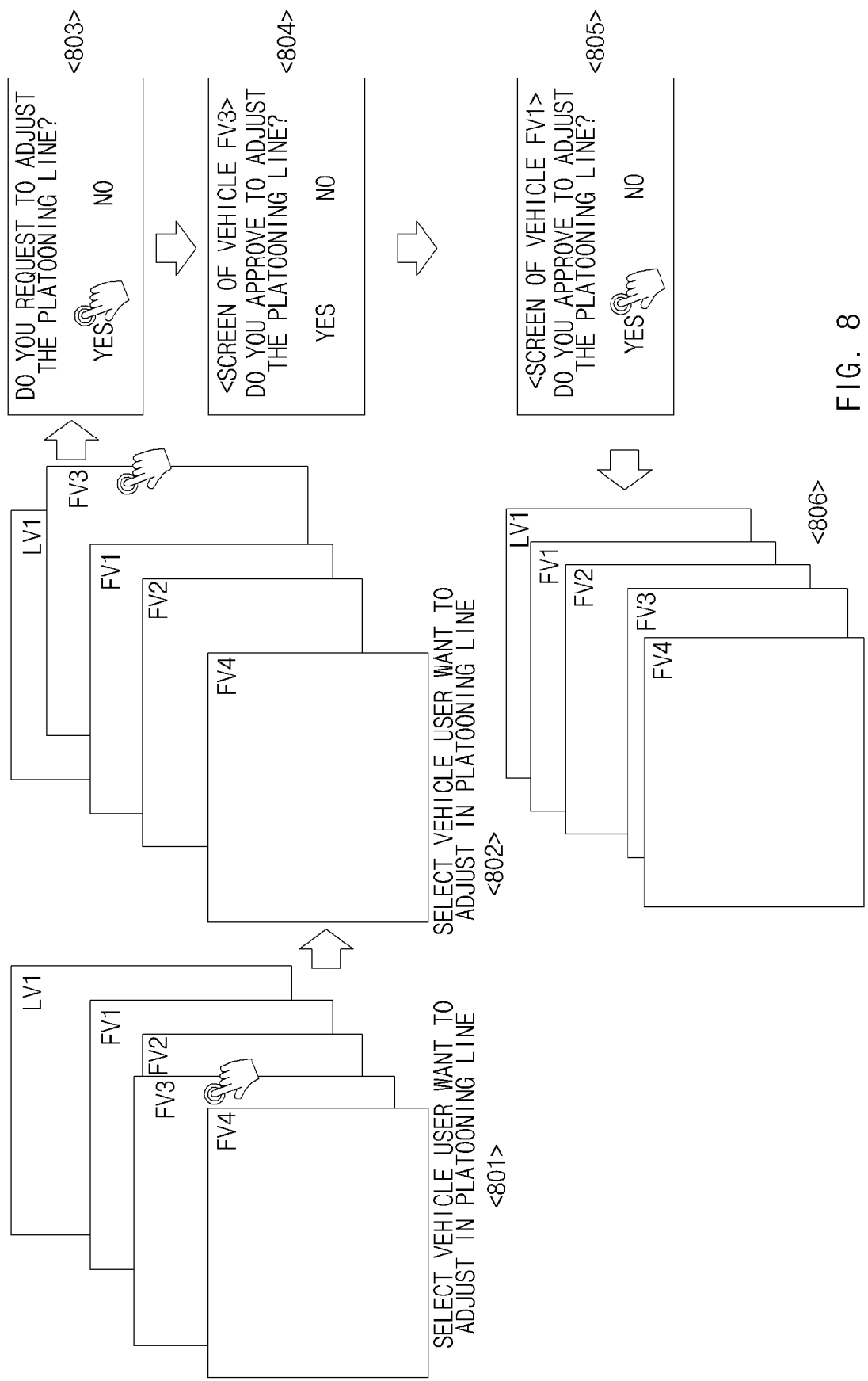
FIG. 8 is a drawing illustrating a screen for displaying a process of adjusting a platooning line of a leading vehicle according to an exemplary embodiment of the present disclosure.

FIG. 8 is a drawing illustrating a screen for displaying a process of adjusting a platooning line of a leading vehicle according to an exemplary embodiment of the present disclosure. Referring to FIG. 8, an exemplary embodiment is exemplified as a user of leading vehicle LV1 touches and selects a vehicle (e.g., following vehicle FV3) that is desired to be adjusted in a platooning line, like reference numeral 801, and moves a vehicle area of following vehicle FV3 to a desired location (e.g., between leading vehicle LV1 and following vehicle FV1) like reference numeral 802. Thus, a platooning controller 100 of leading vehicle LV1 may be configured to display a question and answer screen, such as reference numeral 803, for requesting to adjust the platooning line.

When the user of leading vehicle LV1 touches "Yes", the platooning controller 100 of leading vehicle LV1 may be configured to request following vehicle FV3 to adjust the platooning line. A display of following vehicle FV3 may be configured to output or display a question and answer screen for approving the request for adjusting the platooning line, like reference numeral 804. Thus, when a user of following vehicle FV3 touches "Yes" and approves to adjust the platooning line, the leading vehicle LV1 may be configured to request following vehicle FV3 to adjust the platooning line. A display of following vehicle FV1 may be configured to output or display a question and answer screen, such as reference numeral 805, for approving the request for adjusting the platooning line.

Thus, when following vehicle FV1 approves the adjustment of the platooning line, following vehicle FV3 may move immediately behind leading vehicle LV1 and following vehicle FV1 may move to a third location. Thus, the platooning line in a state where the line is adjusted may be displayed like reference numeral 806 on a display of each platooning vehicle. In particular, a vehicle area corresponding to a host vehicle may be output in a blinking manner while the platooning line is adjusted. When the adjusting of the platooning line is completed, the blinking may be stopped. For example, when a screen such as reference numeral 806 is displayed on a display of following vehicle FV2, a vehicle area of following vehicle FV2 may be output in a blinking manner. When a screen such as reference numeral 806 is displayed on a display of leading vehicle LV1, a vehicle area of leading vehicle LV1 may be output in a blinking manner.

Figure 9:
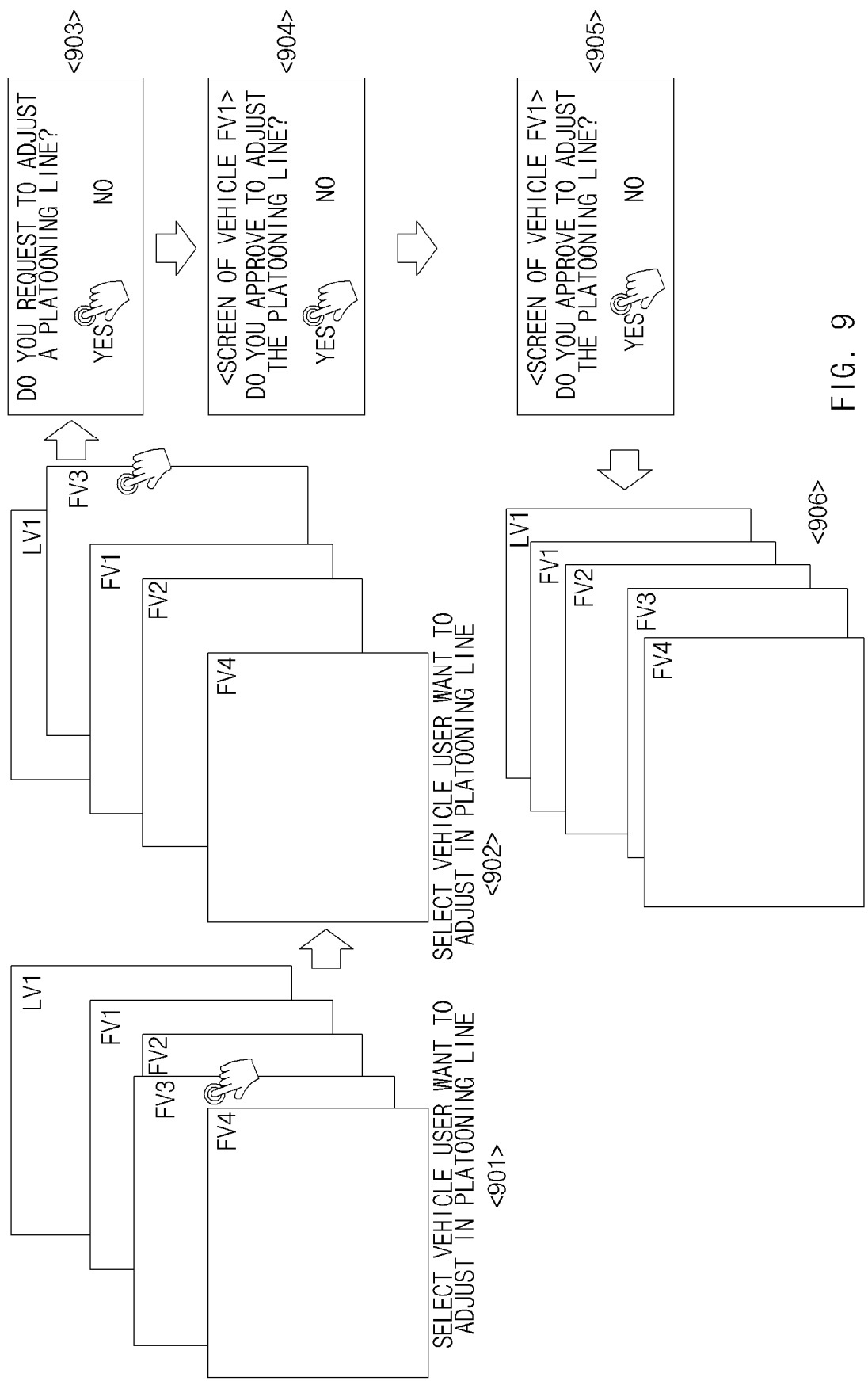
FIG. 9 is a drawing illustrating a screen for displaying a process of adjusting a platooning line of a following vehicle according to an exemplary embodiment of the present disclosure.

FIG. 9 is a drawing illustrating a screen for displaying a process of adjusting a platooning line of a following vehicle according to an exemplary embodiment of the present disclosure. FIG. 9 illustrates a process of adjusting a platooning line when a host vehicle is following vehicle FV3. Referring to FIG. 9, an exemplary embodiment is exemplified as a user of following vehicle FV3 touches and selects a vehicle area of the host vehicle (following vehicle FV3) like reference numeral 901 and moves the vehicle area of following vehicle FV3 to a desired location (e.g., between leading vehicle LV1 and following vehicle FV1), like reference numeral 902. Thus, a platooning controller 100 of following vehicle FV3 may be configured to display a question and answer screen, such as reference numeral 903, for requesting to adjust a platooning line. When a user of following vehicle FV3 touches "Yes", the platooning controller 100 of following vehicle FV3 may be configured to request following vehicle FV1 to adjust the platooning line.

A display of following vehicle FV1 may be configured to display a question and answer screen, such as reference numeral 904, for approving the request for adjusting the platooning line. When following vehicle FV1 approves to adjust the platooning line, the platooning controller 100 of following vehicle FV3 may be configured to request leading vehicle FV1 to approve to adjust the platooning line. A display of leading vehicle LV1 may be configured to output or display a question and answer screen, such as reference numeral 905, for requesting to approve to adjust the platooning line. Thus, when a user of leading vehicle LV1 approves to adjust the platooning line, following vehicles FV1 and FV3 may adjust the platooning line. A screen, such as reference numeral 906, for adjusting the platooning line may be displayed on displays of all vehicles included in the platooning line. In particular, while the platooning line is adjusted, the vehicle area corresponding to the host vehicle may be output in a blinking manner on the displays. When the joining of the platooning line is completed, the blinking may be stopped.

Figure 10:
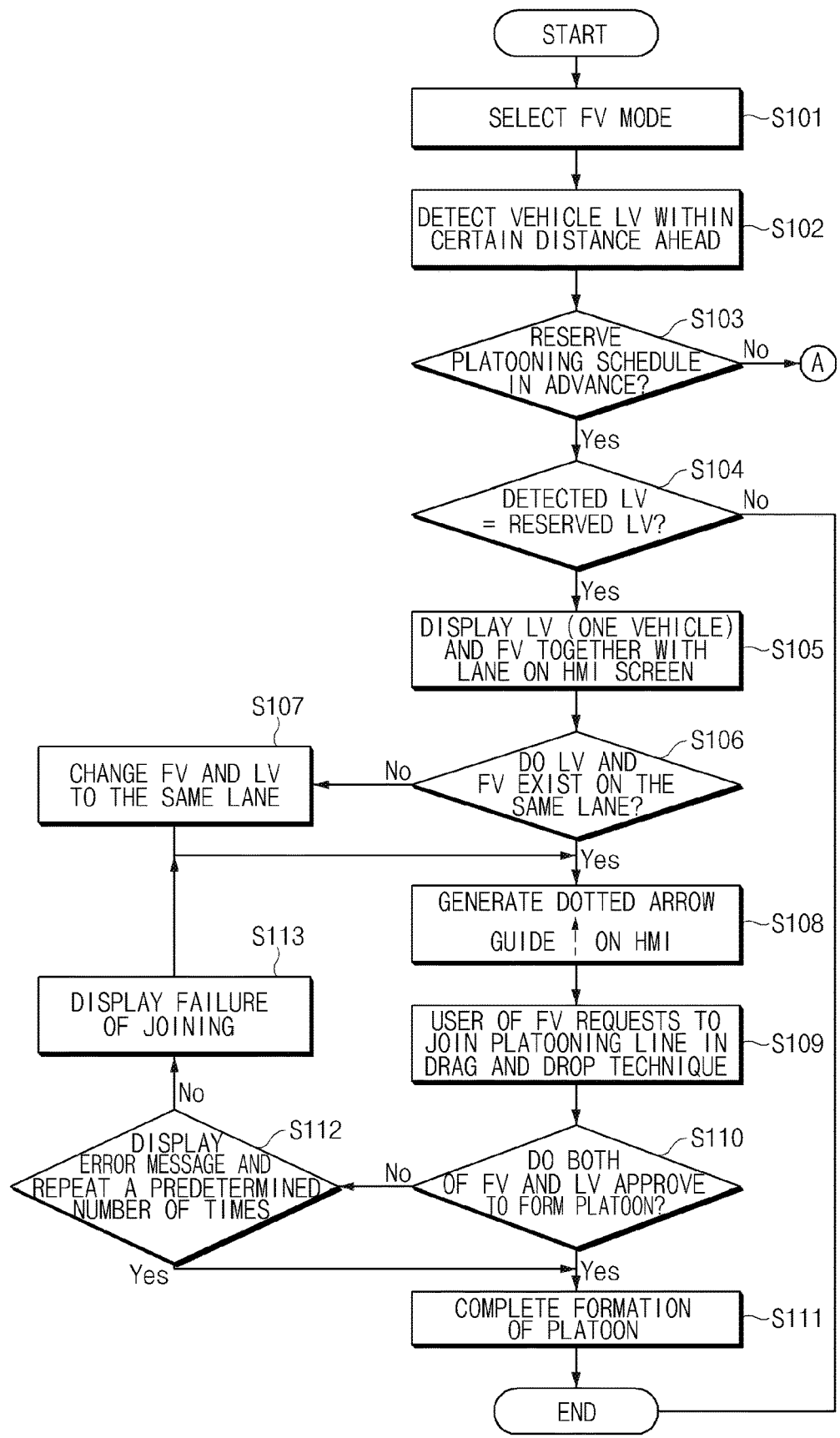
FIG. 10 is a flowchart illustrating a platooning control method according to an exemplary embodiment of the present disclosure.
Figure 11:
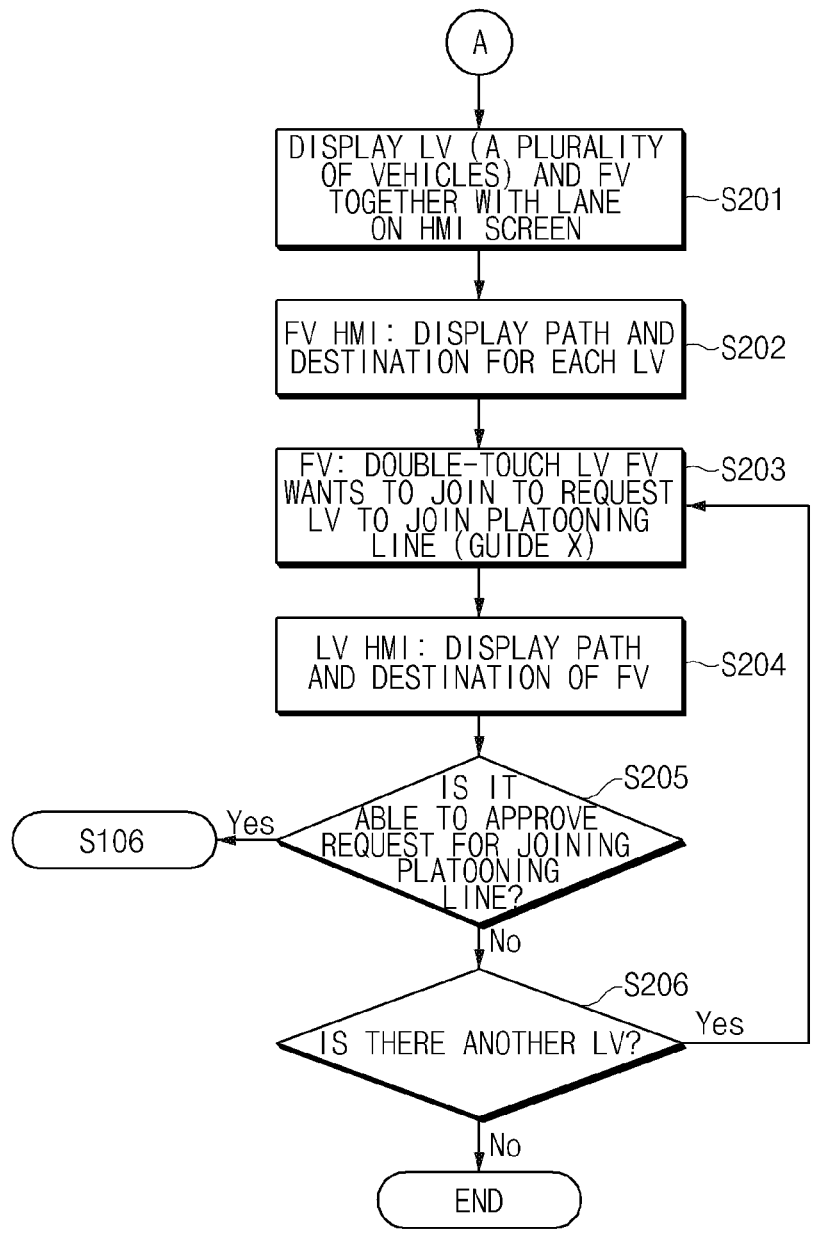
FIG. 11 is a flowchart illustrating a platooning control method when platooning is not reserved in advance, according to an exemplary embodiment of the present disclosure.

Hereinafter, a description will be given in detail of a platooning control method according to an exemplary embodiment of the present disclosure with reference to FIGS. 10 and 11. FIG. 10 is a flowchart illustrating a platooning control method according to an exemplary embodiment of the present disclosure. FIG. 11 is a flowchart illustrating a platooning control method when platooning is not reserved in advance, according to an exemplary embodiment of the present disclosure.

Hereinafter, it is assumed that a platooning controller 100 of FIG. 1 performs a process of FIGS. 10 and 11. Furthermore, in a description of FIGS. 10 and 11, an operation described as being by performed by an apparatus may be understood as being performed by a processor 130 of the platooning controller 100.

In S101, when an FV mode is selected by a user during platooning, the apparatus may be configured to operate a host vehicle to travel in the following vehicle (FV) mode. In S102, the apparatus may be configured to detect a vehicle, capable of playing a role as a leading vehicle (LV) and performing platooning, within a predetermined distance from the front of the host vehicle via vehicle-to-vehicle (V2V) communication while the host vehicle is being driven. In S103, the apparatus may be configured to determine whether following vehicle FV is a vehicle which reserves a platooning schedule in advance. When following vehicle FV is the vehicle which reserves the platooning schedule in advance, in S104, the apparatus may be configured to determine whether the detected leading vehicle LV is the reserved leading vehicle LV.

When the detected leading vehicle LV is the reserved leading vehicle LV, in S105, the apparatus may be configured to display lanes of the host vehicle (following vehicle FV) and leading vehicle LV together with a current lane location of the host vehicle on an HMI screen. In S106, the apparatus may be configured to determine whether a leading vehicle LV and a following vehicle FV are in the same lane. When there are no leading vehicles LV and following vehicles FV in the same lane, in S107, the apparatus may be configured to move following vehicle FV and leading vehicle LV to the same lane to be in a state capable of performing platooning.

When a leading vehicle LV and a following vehicle FV are in the same lane, in S108, the apparatus may be configured to generate a dotted arrow guide between the host vehicle (following vehicle FV) and leading vehicle LV. In S109, a user of following vehicle FV may request to join a platooning line in a drag and drop technique. In S110, the apparatus may be configured to determine whether both of leading vehicle LV and following vehicle FV approve to form a platoon. When both of leading vehicle LV and following vehicle FV approve to form the platoon, in S111, the apparatus may complete the formation of the platoon.

When leading vehicle LV or following vehicle FV does not approve to form the platoon, in S112, the apparatus may be configured to display an error message on the HMI and repeat the request for approval to form the platoon a predetermined number of times. When leading vehicle LV or following vehicle FV does not approve to form the platoon continuously, in S113, the apparatus may be configured to display failure of the platoon joining. Thus, the apparatus may repeat S108 to S113.

Meanwhile, when following vehicle FV does not reserve the platooning schedule in S103 in advance and when leading vehicle LV is detected within a predetermined range of following vehicle FV which does not reserve the platooning schedule in advance, in S201, the apparatus may be configured to display the selected leading vehicle LV (e.g., display all when a plurality of leading vehicles are detected) together with a lane and a host vehicle (following vehicle FV) on the HMI screen.

When there are a plurality of leading vehicles, in S202, the apparatus may be configured to display a final destination and an important path for each leading vehicle on the HMI screen. In S203, a user of following vehicle FV may double-touch or double-click the leading vehicle LV for platoon joining and may query the leading vehicle LV as to whether the following vehicle FV is able to join a platooning line led by leading vehicle LV. In particular, the apparatus may fail to display a guide when querying leading vehicle LV to join the platooning line.

Meanwhile, in S204, the apparatus of leading vehicle LV may be configured to display a path and a final destination of following vehicle FV as a pop-up on an HMI. In S205, leading vehicle LV may be configured to determine whether it is able to approve the request for joining the platooning line. When the request for joining the platooning is granted by leading vehicle LV, the apparatus may perform S106 to S113 of FIG. 10.

Meanwhile, when the request for joining the platooning line is not granted (denied) by leading vehicle LV (e.g., first leading vehicle), in S206, the apparatus may be configured to determine whether there is another leading vehicle within a predetermined distance. When another leading vehicle (e.g., a second leading vehicle) is detected, the apparatus may perform S203 to S206 with respect to the second leading vehicle. In particular, the apparatus may fail to display leading vehicle LV, which denies the request for joining the platooning line, on the HMI, and may be configured to display another new leading vehicle.

Accordingly, an exemplary embodiment of the present disclosure may integrate platooning situations, passively displayed on an on/off switch and a cluster, into one platooning situation and display the integrated one platooning situation on the HMI to provide various commands for each situation and express an intention of the user rather than a simple on/off command, thus efficiently operating platooning control and performing safely control.

Furthermore, according to an exemplary embodiment of the present disclosure, the user may express a command intuitively and simply in an unknown touch manner Although there are a plurality of vehicles forming a platoon, an exemplary embodiment of the present disclosure may display each of the vehicles. An exemplary embodiment of the present disclosure may display height information of a platooning vehicle intuitively and may adjust a platooning line.

Figure 12:
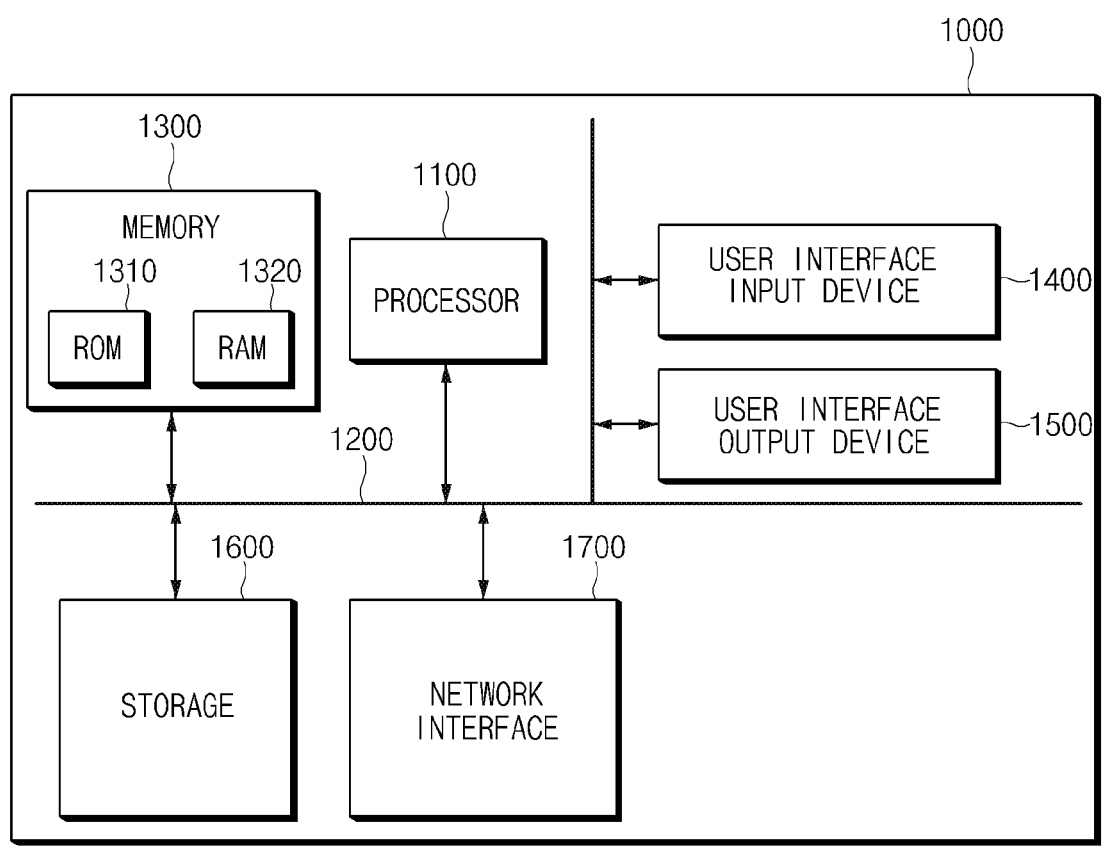
FIG. 12 is a block diagram illustrating a computing system according to an exemplary embodiment of the present disclosure.

FIG. 12 is a block diagram illustrating a computing system according to an exemplary embodiment of the present disclosure. Referring to FIG. 12, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320. Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

An exemplary embodiment of the present disclosure may display vehicle areas of platooning vehicles in a manner to arrange and display the vehicle areas to be partially overlapped with each other, may display all of a substantial number of platooning vehicles on one screen, and display states (e.g., a model, a vehicle height, a vehicle weight, and the like) of platooning vehicles such that the user may intuitively identify the states of the platooning vehicles, thus increasing the efficiency of platooning control.

Furthermore, an exemplary embodiment of the prevent disclosure may input a command to perform platooning control on a screen in a touch manner, thus conveniently reflecting an intention of the user to perform platooning control and performing the platooning control. In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. A platooning controller, comprising:
a processor configured to:
display each of a plurality of vehicles forming a platoon as a vehicle area, wherein the vehicle area of each of the plurality of vehicles is displayed as a box;
display a vehicle area corresponding to a leading vehicle and vehicle areas corresponding to respective following vehicles as a laminated structure, wherein the vehicle area of the leading vehicle is located at the top or at the bottom of the vehicle areas in the laminated structure and is followed by the vehicle areas of the following vehicles;
display vehicle areas of the vehicles on a screen to be partially overlapped with each other; and
perform platooning control to designate a location of a vehicle selected from the plurality of vehicles within the platoon based on movement of the vehicle area of the selected vehicle in a drag and drop technique; and
a storage configured to store information for configuring the screen by the processor to display vehicle state information.

2. The platooning controller of claim 1, wherein the processor is configured to perform at least one platooning control among joining a platooning line, departing from the platooning line, and adjusting the platooning line.

3. The platooning controller of claim 1, wherein the processor is configured to display a size of the vehicle area based on at least one of a model, a vehicle height, and/or a vehicle weight for each vehicle.

4. The platooning controller of claim 3, wherein the processor is configured to display a vertical length of the vehicle area based on a height of the vehicle.

5. The platooning controller of claim 1, wherein the processor is configured to separately display at least one or more of shapes, colors, and borders of vehicle areas of a host vehicle and another vehicle among vehicles of the plurality of vehicles forming a platoon.

6. The platooning controller of claim 1, wherein, in response to selection of one of the displayed vehicle areas of the plurality of vehicles forming a platoon, the processor is configured to:
expand the area displayed for theme selected vehicle area, and
display vehicle state information on the expanded vehicle area.

7. The platooning controller of claim 6, wherein the vehicle state information includes at least one or more of a model, a destination, a payload, a payload weight, a vehicle height, information indicating whether a spoiler is mounted, and a total Wig-distance driven during platooning.

8. The platooning controller of claim 1, wherein the processor is configured to:

display the vehicle area of a vehicle in a blinking manner when performing the platooning control for the vehicle, and stop display of the vehicle area in the blinking manner when performing the platooning control for the vehicle is completed.

9. The platooning controller of claim 2, wherein the processor is configured to perform the platooning control to request a leading vehicle to form a platoon, receive approval to the request, and move the vehicle area of the host vehicle to a location matched to an order in the platooning line, when a vehicle area of a host vehicle is dragged and dropped to be moved to a location partially overlapped with a vehicle area of the platooning line or to be moved less than or equal to a predefined distance from the vehicle area of the platooning line.

10. The platooning controller of claim 1, wherein the processor is configured to perform platoon departure control, when a vehicle area of a host vehicle is dragged and dropped to be moved greater than a predefined distance from a vehicle area of a platooning line.

11. The platooning controller of claim 1, wherein when one of the vehicle areas of the vehicles is dragged and dropped to be moved to another location in a platooning line, the processor is configured to request a vehicle of a moved vehicle area to move a location in a platooning line, and when the vehicle of the moved vehicle area approves the request for moving the location in the platooning line, the processor is configured to request a following vehicle to be located behind the moved vehicle area to adjust a platooning interval.

12. A vehicle system, comprising:
the platooning controller of claim 1; and
a display configured to display the screen.

13. The vehicle system of claim 12, wherein the display is driven in a touch screen mode.

14. The vehicle system of claim 12, further comprising:
a communication device configured to perform communication between vehicles in a platooning line and share platooning information.

15. A platooning control method, comprising:
configuring, by a processor, each of a plurality of vehicles forming a platoon as a predetermined vehicle area on a platooning control screen, wherein the vehicle area of each of the plurality of vehicles is displayed as a box;

displaying, by the processor, a vehicle area corresponding to a leading vehicle and vehicle areas corresponding to respective following vehicles as a laminated structure, wherein the vehicle area of the leading vehicle is located at the top or at the bottom of the vehicle areas in the animated structure and is followed by the vehicle areas of the following vehicles;

displaying, by the processor, vehicle areas of the vehicles to be partially overlapped with each other to configure a screen;

performing, by the processor, platooning control to designate a location of a vehicle selected from the plurality of vehicles within the platoon based on movement of the predetermined vehicle area of the selected vehicle in a drag and drop technique; and storing, by a storage, information for configuring the screen by the processor to display vehicle state information.

16. The platooning control method of claim 15, wherein the configuring of the screen includes:

receiving, by the processor, a selection of one of the displayed vehicle areas of the plurality of vehicles forming a platoon;

expanding, by the processor, the area displayed for theft selected vehicle area; and configuring, by the processor, the screen to display vehicle state information on the expanded vehicle area.

17. The platooning control method of claim 15, wherein the performing of the platooning control includes:

performing, by the processor, the platooning control to request a leading vehicle to form a platoon, receive approval to the request, and move the vehicle area of the host vehicle to a location matched to an order in a platooning line, when a vehicle area of a host vehicle is dragged and dropped to be moved to a location partially overlapped with a vehicle area of the platooning line or to be moved less than or equal to a predefined distance from the vehicle area of the platooning line.

18. The platooning control method of claim 15, wherein the performing of the platooning control includes:

performing, by the processor, platoon departure control, when a vehicle area of a host vehicle is dragged and dropped to be moved greater than a predefined distance from a vehicle area of a platooning line.

* * * * *